US012118300B2

(12) United States Patent
Hashimoto et al.

(10) Patent No.: US 12,118,300 B2
(45) Date of Patent: Oct. 15, 2024

(54) DOCUMENT CREATION DEVICE

(71) Applicants: Knowledge on Demand Co., Ltd., Tokyo (JP); MAKINO MILLING MACHINE CO., LTD., Tokyo (JP)

(72) Inventors: Yoshio Hashimoto, Saitama (JP); Ryosuke Togashi, Tokyo (JP); Kayoko Ichimura, Yamanashi (JP)

(73) Assignees: Knowledge on Demand Co., Ltd., Tokyo (JP); MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 18/247,255

(22) PCT Filed: Sep. 30, 2021

(86) PCT No.: PCT/JP2021/036316
§ 371 (c)(1),
(2) Date: Mar. 29, 2023

(87) PCT Pub. No.: WO2022/071541
PCT Pub. Date: Apr. 7, 2022

(65) Prior Publication Data
US 2023/0409825 A1    Dec. 21, 2023

(30) Foreign Application Priority Data
Sep. 30, 2020  (JP) ................. 2020-165333

(51) Int. Cl.
*G06F 3/00*    (2006.01)
*G06F 16/93*    (2019.01)
(Continued)

(52) U.S. Cl.
CPC ............ *G06F 40/197* (2020.01); *G06F 16/93* (2019.01); *G06F 40/186* (2020.01)

(58) Field of Classification Search
None
See application file for complete search history.

(56) References Cited

U.S. PATENT DOCUMENTS

2006/0074849 A1*  4/2006  Lee ................ H04N 1/00241
2008/0219543 A1*  9/2008  Csulits ................ G07D 7/12
382/135

(Continued)

FOREIGN PATENT DOCUMENTS

JP    H05-342201 A    12/1993
JP    H09-305578 A    11/1997
(Continued)

OTHER PUBLICATIONS

International Search Report for PCT/JP2021/036316 (Dec. 28, 2021).

*Primary Examiner* — Toan H Vu
(74) *Attorney, Agent, or Firm* — Merchant & Gould P.C.

(57) ABSTRACT

A document creating device (10): creates a common document (100) serving as a template for creating a derived document (300), and a difference document (200) including a region (106) in which an element (206) different from elements (112, 114, 116, 114) in the common document is embedded, and an empty region (108); and generates the derived document (300) from the common document by replacing the elements in the common document with elements in the corresponding region of the difference document.

6 Claims, 7 Drawing Sheets

(51) Int. Cl.
*G06F 40/186* (2020.01)
*G06F 40/197* (2020.01)

(56) References Cited

U.S. PATENT DOCUMENTS

| | | | | |
|---|---|---|---|---|
| 2013/0110796 | A1* | 5/2013 | Butler | G06F 16/1873 |
| | | | | 707/E17.009 |
| 2014/0212053 | A1* | 7/2014 | Horiuchi | G06F 16/2358 |
| | | | | 382/218 |
| 2014/0223274 | A1* | 8/2014 | Nakamura | G06F 16/9577 |
| | | | | 715/205 |
| 2015/0193408 | A1* | 7/2015 | Ho | G06F 16/9535 |
| | | | | 715/255 |
| 2015/0317295 | A1* | 11/2015 | Sherry | G06F 40/117 |
| | | | | 715/226 |
| 2019/0251140 | A1* | 8/2019 | Tashman | G06F 3/04883 |
| 2020/0226195 | A1* | 7/2020 | Ziraknejad | G06F 3/0482 |
| 2021/0174078 | A1* | 6/2021 | Harada | G06V 30/418 |
| 2021/0289078 | A1* | 9/2021 | Kato | H04N 1/0044 |

FOREIGN PATENT DOCUMENTS

| | | | |
|---|---|---|---|
| JP | 2002-24211 | A | 1/2002 |
| JP | 2006-251967 | A | 9/2006 |
| JP | 2006-260133 | A | 9/2006 |
| JP | 2014-035638 | A | 2/2014 |

\* cited by examiner

FIG. 7

LUBRICANT REPLENISHMENT

⚠ WARNING

<PRIMARY OPERATIONS>
- BE SURE TO TURN OFF THE POWER BEFORE PERFORMING THIS OPERATION
- BE SURE TO WEAR PROTECTIVE GLOVES AND SAFETY GLASSES WHEN PERFORMING THIS OPERATION

MAINTENANCE CYCLE

| PERIOD | — | |
|---|---|---|
| OPERATION TIME | — | |
| OTHER | · WHEN WARNING NO. XXXX IS GENERATED<br>· WHEN ALARM NO. 0000 IS GENERATED<br>· WHEN THERE IS AN ABNORMALITY IN INSPECTION | |

OPERATION LOCATION

DOCUMENT CREATION DEVICE

This application is a National Stage Application of PCT/JP2021/036316, filed Sep. 30, 2021, which claims benefit of priority to Application No. 2020-165333, filed Sep. 30, 2020, in Japan, and which applications are incorporated herein by reference. To the extent appropriate, a claim of priority is made to each of the above disclosed applications.

FIELD

The present invention relates to a document creation device for creating multiple types of documents having similar contents.

BACKGROUND

Reference 1 describes an electronic manual output system which manages user privilege information that indicating privilege related to viewing, editing, and create approval of electronic documents for individual users, and which controls so that multiple users cannot edit one electronic file at the same time.

CITATION LIST

Patent Literature

[PTL 1] Japanese Unexamined Patent Publication (Kokai) No. 2014-035638
[PTL 2] Japanese Unexamined Patent Publication (Kokai) No. 2006-251967

SUMMARY

Technical Problem

In industrial products, including mechanical products such as machine tools, multiple models of the same type of machine are produced due to improvements and special orders from users. In such a case, though the product manual has different content for each different machine, many portions are written with common content between models of the same type. However, in the prior art, including the invention of Patent Literature 1, since manual data is generated and managed for each product, when correcting a common portion, it is necessary to individually correct the relevant portions for the number of products. In the invention of Patent Literature 2, a manual is composed from section units, and the manual including the sections is output. However, in the invention of Patent Literature 2, when one section is modified, it is difficult to grasp the extent of modification influence, which is not practical. Management of corrected and uncorrected versions is also required.

The present invention aims to solve the problems of the prior art, and an object thereof is to provide a document creation device which is configured to easily create similar documents, share common portions between multiple different documents having the common portions, and when attempting to modify or change the common portions, be able to simultaneously correct applicable common portions of only documents which need to be corrected or changed.

Solution to Problem

In order to achieve the object described above, according to the present invention, there is provided a document creation device for creating a document, comprising a document storage unit for storing a common document in which an element is embedded in each of a plurality of regions and which serves as a template for generating a derived document, and a difference document having regions for embedding elements corresponding to the plurality of regions, and having elements embedded in the regions which are different from the elements embedded in the common document, a management table storage unit which stores combination of regions in which the elements of the difference document are embedded and regions of the common document corresponding to these regions, and a document generating unit which generates a derived document from the common document by replacing the elements of the common document with the elements of the corresponding regions of the difference document based on the combination stored in the management table storage unit.

Advantageous Effects of Invention

According to the present invention, similar documents are managed as a common document, whereby common portions can be corrected at once, which prevents omission of corrections and reduces man-hours for correction and translation. Furthermore, since the scope of influence of modifications and changes is limited to the common document, the scope of influence can easily be understood, whereby unexpected changes can be prevented, and it is not necessary to manage corrected and uncorrected documents. At the same time, by managing individual parts of derived documents with differences documents, differences between similar derived documents can be clarified.

BRIEF DESCRIPTION OF DRAWINGS

FIG. 7 is a view showing a specific example of a derived document.

DESCRIPTION OF EMBODIMENTS

Preferred embodiments of the present invention will be described below with reference to the attached drawings.

The present invention relates to a document creation device for creating a document (electronic document) on a computer system. Electronic documents to which the present invention is applied typically include electronic manuals, but may be other electronic documents. Electronic manuals are publications in electronic or other media form describing the operation, specifications, etc., of a handled product, and may include instruction manuals, operating instructions, specifications, and design documents.

Figure 1:
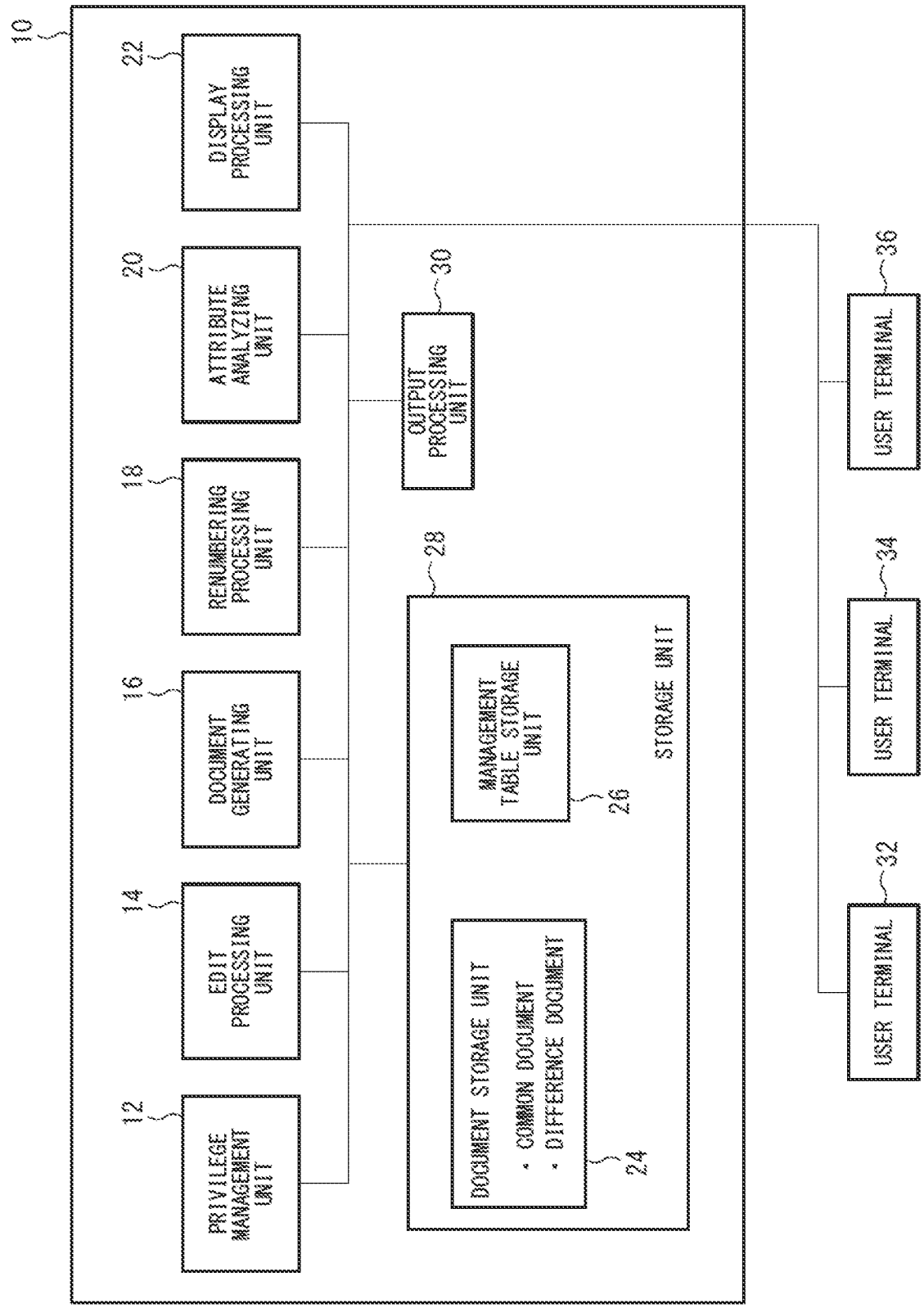
FIG. 1 is a block diagram illustrating a document creation device according to a preferred embodiment of the present invention.

In FIG. 1, a document creation device 10 can be composed of a computer having a CPU (central processing element), memory devices such as RAM (random access memory) and ROM (read-only memory), storage devices such as an HDD (hard disk drive) and an SSD (solid state drive), I/O ports, and bi-directional buses interconnecting these, as well as software associated therewith, and it comprises, as primary consistent elements, an edit processing unit 14, a document generating unit 16, and a storage unit 28.

The document creation device 10 can be connected to one or a plurality of user terminals 32, 34, 36 (three in the example of FIG. 1) via wireless or wired communication means, for example, network means such as a LAN or the internet. The user terminals can be a personal computer, smartphone or a tablet.

The edit processing unit 14 creates and edits elements of a document based on commands from the user terminals 32, 34, 36. The document is an electronic document or electronic file created on a computer, typically an HTML file, but can be of any type. In the present invention, the term "document" includes common documents, differences documents, and derived documents, and common documents and differences documents are stored in a document storage unit 24, which is part of the storage regions of the storage unit 28.

Figure 2:
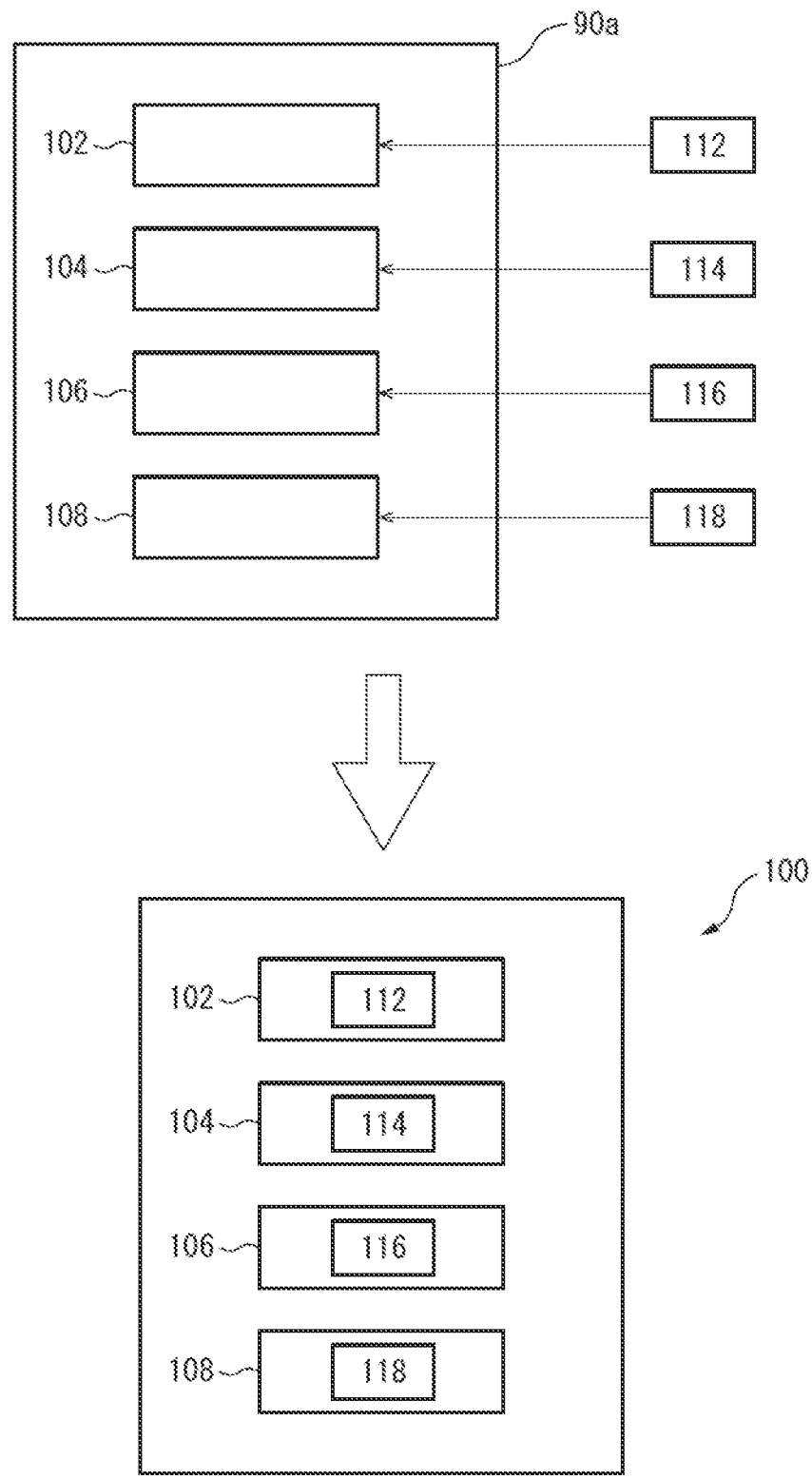
FIG. 2 is a schematic diagram for detailing a common document.

Referring to FIG. 2, a common document 100 is an electronic document which serves as a model or template for generating a derived document, and is constructed by one or a plurality of (four in the example of FIG. 2) regions 102, 104, 106, 108 defined by a blank 90a, and each region is embedding or combining elements 112, 114, 116, 118.

The regions may be empty regions which are free of elements.

In addition to the regions 102, 104, 106 108, the blank 90a may also contain elements outside these regions. The elements may be contents such as text, tables, images including icons, or video, and may contain link information. Alternatively, the elements may be control information when generating a derived document, such as organization or attribute information.

The blank, each region, and element are present independently, and as long as the blank and each region, each region and element, and the order of the regions or the elements are associated in a management table, the form in which they are stored does not matter.

Figure 3:
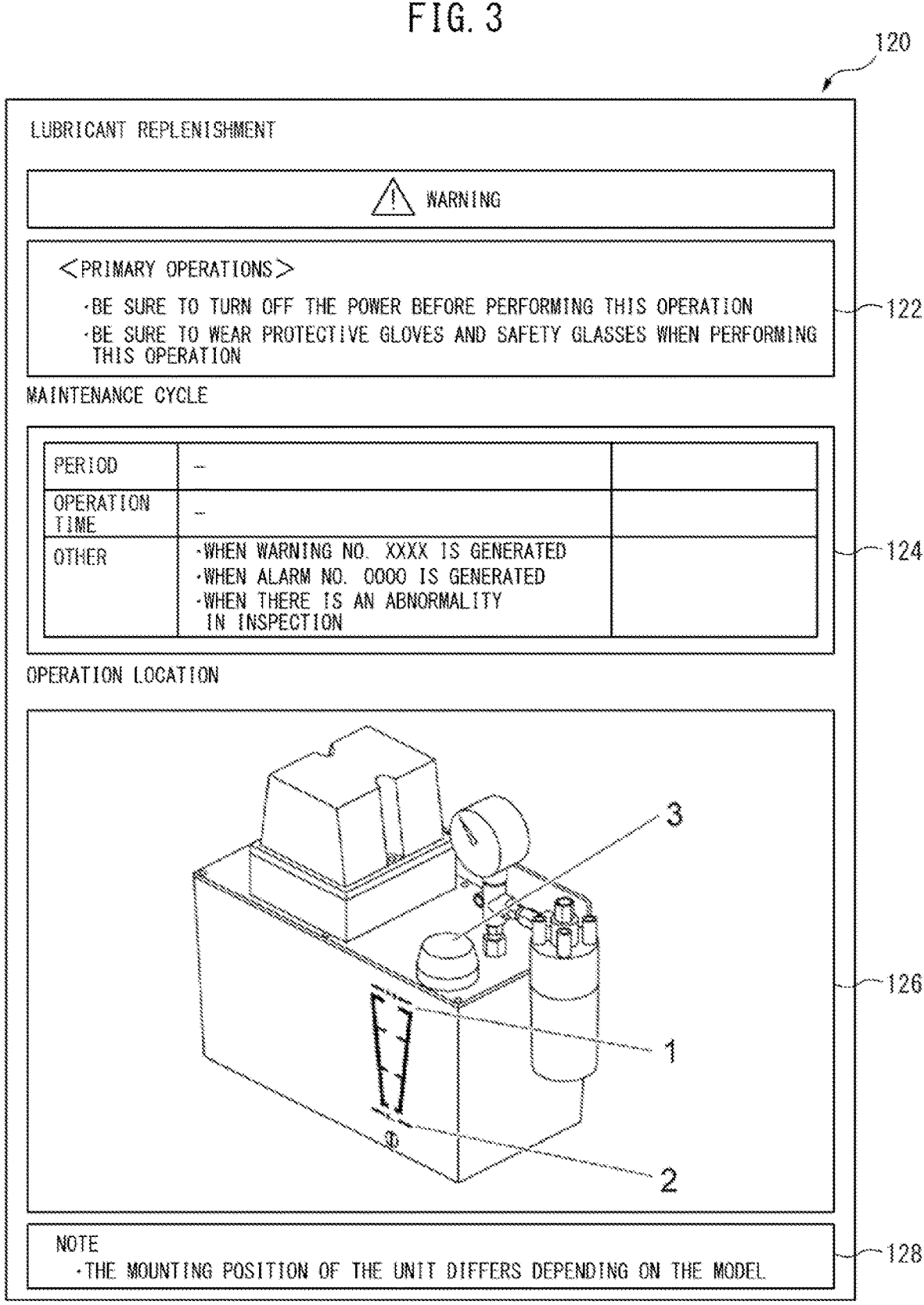
FIG. 3 is a view showing a specific example of a common document.

Referring to FIG. 3, a common document 120 contains regions 122, 124, 126, 128. In the region 122, the text:
<Primary Operations>
Be sure to turn off the power before performing this operation
Be sure to wear protective gloves and safety glasses when performing this operation is embedded or associated as an element.

In region 124, the table:

TABLE 1

| Period | — |
| Operation time | — |
| Other | When warning No. XXXX is generated |
| | When alarm No. OOOO is generated |
| | When there is an abnormality in inspection | is embedded or associated as an element.

In the region 126, an image showing an inspection location is embedded or associated as an element.

In the region 128, the text:
Note
The mounting position of the unit differs depending on the model.
is embedded or associated as an element.

Figure 4:
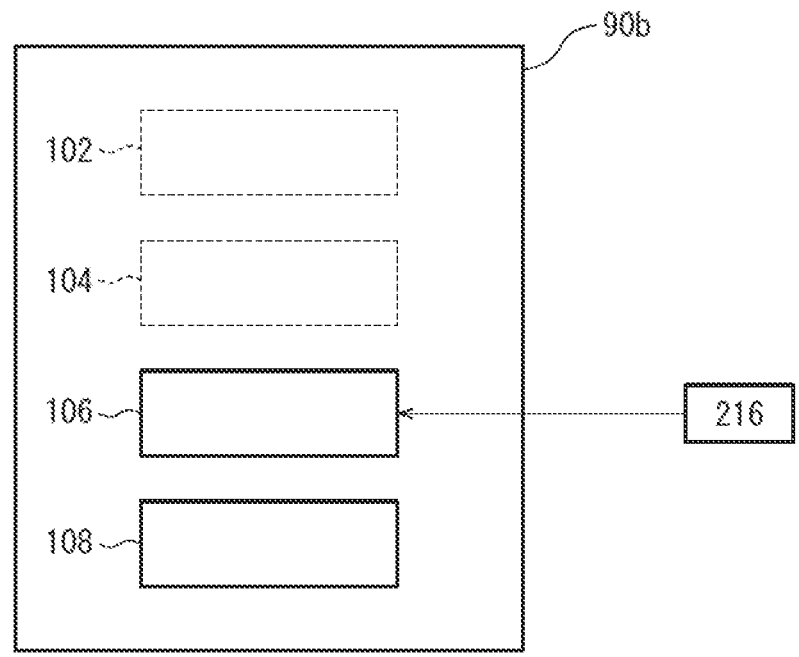
FIG. 4 is a schematic diagram for detailing a differences document.
Figure 4:
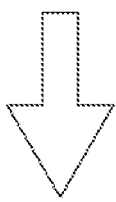
Figure 4:
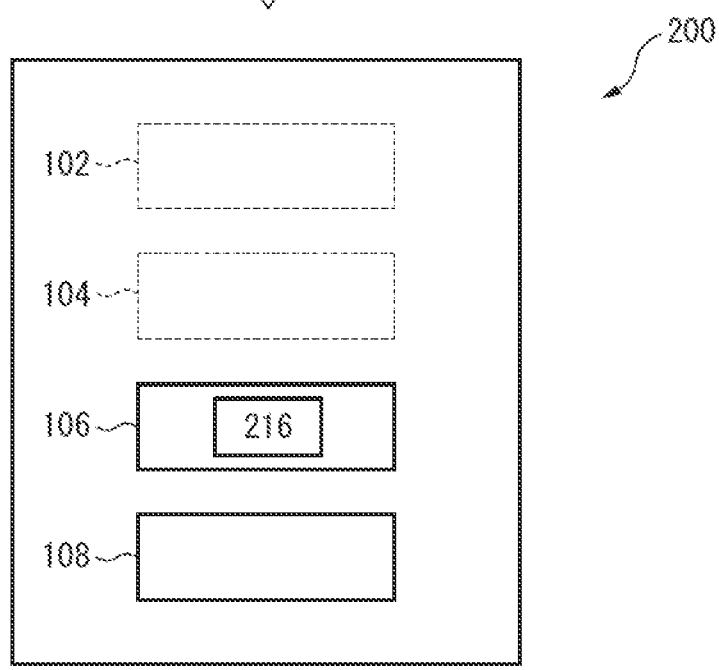

When generating a derived document in which the image of region 126 in the example of FIG. 3 is changed and the element of region 128 is deleted, it is sufficient that the regions 106, 108 corresponding to regions 106, 108 of the common document 100 of FIG. 2 is imparted to a blank 90b of a differences document 200 of FIG. 4, an element 216 different from the element 116 is embedded in the region 106 of the differences document 200, and the region 108 of the differences document 200 is left empty without inserting an element.

The operator operates the user terminals 32, 34, 36 to set the differences document 200 as a derived document of the common document 100. The common document 100 and the differences document 200 are associated using a management table or document identification numbers and stored in the document storage unit 24.

Next, the operator operates the user terminals 32, 34, 36 to set regions 106, 108 for embedding contents different from the common document into the blank 90b of the differences document 200 of FIG. 4. At this time, the combinations of the region 106 of differences document 200 and the region 106 of the common document 100 and, the region 108 of the differences document 200 and the region 108 of the common document 100 are associated using the management table or a region identification number, and are stored in association with the differences document 200 in the management table storage unit 26, which is a part of the storage regions of the storage unit 28.

Further, when the content 216 is embedded in the region 106 of the differences document 200, the region 106 and the content 216 are associated and stored in the storage unit 28, which includes the document storage unit 24 and the management table storage unit 26.

The operator can operate the user terminals 32, 34, 36 to edit the elements 112, 114, 116, 118 of the regions 102, 104, 106, 108 of the common document 100 and the elements of the regions 106, 108 of the differences document 200. The edit processing unit 14 displays the common document 100 or the differences document 200 in an edit mode on a display device or display (not shown) of the user terminals 32, 34, 36. Next, the operator selects regions to be edited from the regions 102, 104, 106, 108 of the common document 100 and the regions 106, 108 of the differences document 200.

Figure 5:
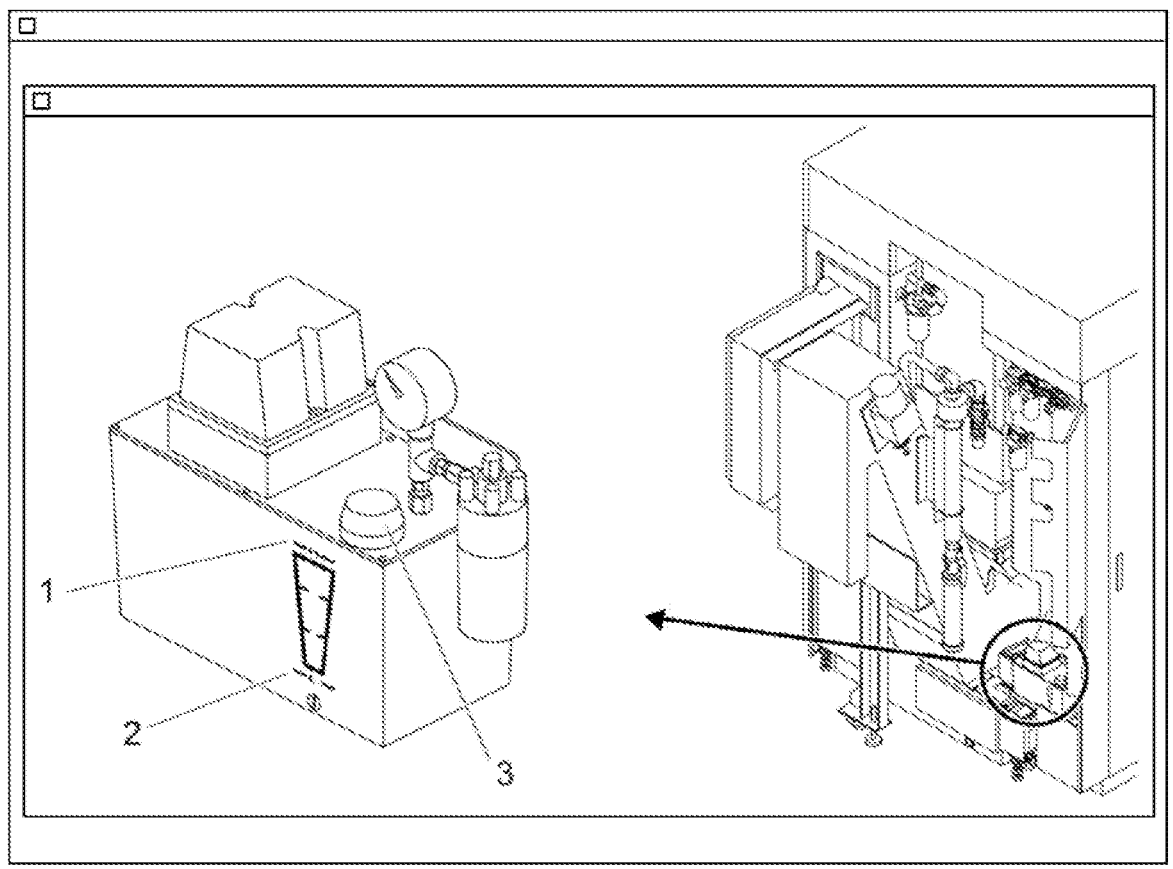
FIG. 5 is a view showing an editing screen for editing an element (for example, contents) of one region.

For example, in the case in which the image embedded in region 126 of the common document 120 of FIG. 3 is copied and used as another image for a derived document 320 of FIG. 7, when the operator selects the region 126, the editing screen of the region 126 is displayed by a display processing unit 22 on the display device of the user terminals 32, 34, 36 operated by the operator, and the operator can edit the region 126 on the editing screen. An example of the editing screen is shown in FIG. 5. It can be understood that when this edited image is embedded in the region 106 of the differences document 200 as an element (contents) 216, the image embedded in the region 126 of the common document 120 is replaced with the other image in the derived document 320 as shown in FIG. 7.

In the case in which a region of the common document 100 is not associated with any region of the differences document 200, when an element (contents such as text or a diagram) embedded in or associated with the region of the common management page is modified, the modification is simultaneously reflected in all derived documents generated in the differences document 200 associated with the common document 100.

For example, if the image of the region 126 of the common document 120 of FIG. 3 is edited and the edited image is embedded in the region 126 of the original common document 120, the edited image is reflected in all of the derived documents generated from the differences document not including the region 126 at once.

Figure 6:
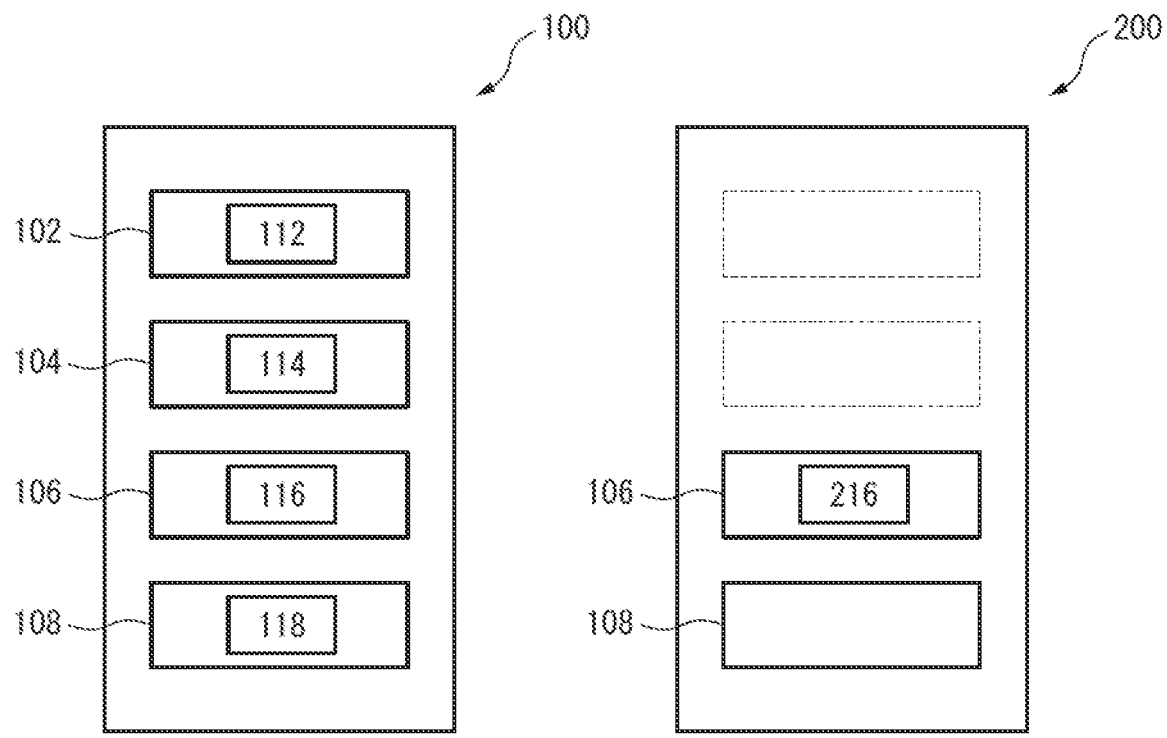
FIG. 6 is a view for detailing generating of a derived document.
Figure 6:
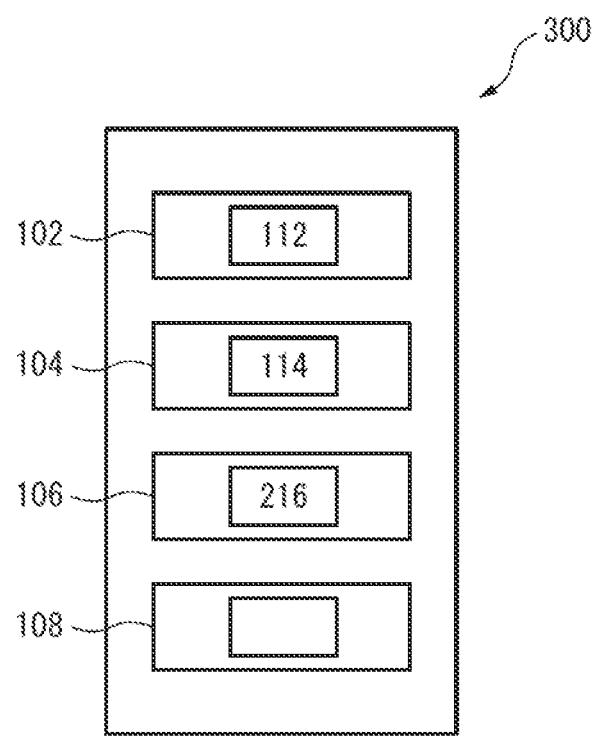

The document generating unit 16 generates a derived document 300 by combining the two layer structures of the differences document 200 and the common document 100, as shown in FIG. 6. The derived document 300 contains elements 112, 114 of the common document 100 and element 216 of the differences document 200.

When the differences document contains a region associated with a region in the common document, the element of the region of the common document is replaced with the element of the corresponding region of the differences document, and in regions in which the region of the common document is not associated with any region of the differences document, the element of the region of the common document becomes the element of the derived document as-is. In the Example of FIG. 6, the derived document 300 is generated such that among the regions 102, 104, 106, 108 of the common document 100, the element 116 of the region 106 associated with the differences document 200 is replaced with the element 216 of the region 106 of the differences document 200, the element 118 of the region 108 of the common document 100 is deleted due to the empty region 108 of the differences document 200, and for the unassociated the regions 102, 104, the elements 112, 114 of the common document 100 become the elements of the derived document as they are.

In the example of FIG. 3, the contents (image) of the region 126 of the common document 120, including regions 122, 124, 126, 128, is changed and the contents (text) of the region 128 is deleted to generate the derived document 320 shown in FIG. 7. In FIG. 7, the derived document 320 includes regions 126, 128 corresponding to the regions 126, 128 of the common document 120 as a differences document, and the image of content 326 has been replaced and the text of the region 128 has been removed due to the empty region (blank contents).

In the differences document, if the region associated with the common document region does not contain an element (if it is blank), when generating the derived document, the region can be treated as deleted.

When the element is control information other than contents, such as format information, the edit processing unit recognizes the attribute or identification code of the element as control information, and can change the typeface of the derived document to gothic bold, or to italics for another derived document.

Even if the common document 100 already has an associated differences document 200, a new region can be freely added to the common document 100 within the blank 90a. Contents can be embedded in or associated with the added region, or the region can be left empty.

When an element (contents such as text or an image) is embedded, the additional element (contents such as text or an image) is simultaneously reflected in the derived documents generated from all of the already associated differences documents.

When an element is not embedded, it has no effect on the derived document generated from all of the already associated differences documents, and if a corresponding region is added to only the differences document to which an element is to be individually added and an element is then added, individual corrections can be made.

By associating a plurality of differences documents 200 with one common document 100, a plurality of similar derived documents 300 can be generated from the one common document 100. Furthermore, a plurality of common documents 100 can be stored in the document storage unit 24, and a plurality of groups containing a plurality similar derived documents 300 can be generated based on this common documents 100.

When a plurality of similar derived documents 300 are generated from one common document 100 in this manner, it is advantageous to be able to easily confirm the relationship of the elements embedded in the corresponding regions among the plurality of derived documents 300. The document creation device 10 can comprise the display processing unit 22 which acquires data stored in the document storage unit 24 and the management table storage unit 26, and based thereon, as shown in the Table below, lists the relationships of the elements embedded in the regions 102, 104, 106, 108 of each of the differences documents 201, 202, 203, 204, 205, 206, 207 constituting the layers of the individual portions of the derived document 300.

TABLE 2

|     | 201 | 202 | 203 | 204 | 205 | 206 | 207 |
|-----|-----|-----|-----|-----|-----|-----|-----|
| 102 | —   | —   | —   | —   | —   | —   | —   |
| 104 | —   | —   | —   | —   | —   | —   | —   |
| 106 | —   | —   | 1   | 1   | 2   | 3   | 3   |
| 108 | —   | —   | —   | —   | —   | —   | —   |

With reference to the above table, it can be understood at a glance that in the region 106, the element embedded in the region 106 of the common document 100 is displayed as-is in the differences documents 201, 202, the element 1 is embedded in the differences documents 203, 204, the element 2 is embedded in the differences document 205, and the element 3 is embedded in the differences documents 206, 207. Furthermore, it becomes clear which differences document is impacted when one element is changed. For example, when the region 106 of the common document is changed, the differences documents 201, 202 are impacted, but the differences documents 203, 204, 205, 206, 207 are not impacted.

Furthermore, as shown in the Table below, a list of elements (contents in this example) to be embedded in the region 106 may be displayed.

TABLE 3

| 106 | | | | |
|-----|-----|-----|-----|-----|
| No. | Value | | | |
| 0 | Name<br>Dedicated cleaner<br>(7/24 taper #40 for spindle) | Arrangement<br>No. aaaaaa | Format | Manufacturer<br>Makino Milling<br>Machine Co., Ltd., | Quantity<br>1 |

TABLE 3-continued

| 106 | | | | |
|---|---|---|---|---|
| No. | Value | | | |
| 1 | Name<br>Dedicated cleaner<br>(7/24 taper #50 for spindle) | Arrangement Format<br>No. bbbbbb | Manufacturer<br>Makino Milling<br>Machine Co., Ltd., | Quantity<br>1 |
| 2 | Name<br>Dedicated cleaner<br>(HSK-A63 for spindle) | Arrangement Format<br>No. cccccc | Manufacturer<br>Makino Milling<br>Machine Co., Ltd., | Quantity<br>1 |
| 3 | Name<br>Dedicated cleaner<br>(HSK-A100 for spindle) | Arrangement Format<br>No. dddddd | Manufacturer<br>Makino Milling<br>Machine Co., Ltd., | Quantity<br>1 |

Documents such as instruction manuals, operating instructions, specifications, and design documents may contain serially numbered procedure numbers, note numbers, drawing numbers, table numbers, and formula numbers, and even if these numbers are serialized without omission in a common document, these numbers may be duplicated or missing due to the addition or removal of regions or contents, or editing of the contents 112, 114, 116, 118, including deleting regions in the common document with empty regions in the differences document, or adding to the common document. The document creation device 10 is provided with a renumbering processing unit 18, and when the document generating unit 16 generates the derived document 300, the serial numbers in the derived document 300 can be renumbered.

The renumbering processing unit 18 can search for a character string that combines letters, such as "*" or "Note" indicating a remark, "Fig." or "Drawing" indicating a drawing number, "Schedule" or "Table" indicating table number, or "Formula" or "eq." indicating a formula number, with numbers, and renumber it so that the number portion becomes a serial number.

Alternatively, the necessary regions and elements extracted as derived documents can be rearranged in similar categories (for example, step numbers) in accordance with meta information linked to the regions and elements, and renumbered so that the numerical portions become a serial number.

The document creation device 10 further comprises a privilege management unit 12 for managing the editing privilege of an individual (operator) operating the document creation device 10, and the editing privilege may be different for editing common documents and editing differences documents. The privilege management unit 12 authenticates an operator who accesses the document creation device 10 from the user terminals 32, 34, 36 via, for example, an ID and password, and obtains from the storage unit 28 information regarding the editing privilege of the operator. The information on editing privilege may include the ID and name (actual name or handle) of the operator.

Note that the regions 102, 104, 106, 108 of the common document 100 and the differences document 200 may be arranged and managed in one-page unit documents as described above, or each region 102, 104, 106, 108 may be managed as one piece of data, and a plurality of regions may be grouped and managed as a common document or differences document in a database.

DESCRIPTION OF REFERENCE SIGNS

12 Privilege Management Unit
14 Edit Processing Unit
16 Document Generating Unit
18 Renumbering Processing Unit
20 Attribute Analyzer Unit
22 Display Processing Unit
24 Document Storage Unit
26 Management Table Storage Unit
28 Storage Unit
32, 34, 36 User Terminal
90a, 90b Blank
100 Common Document
102, 104, 106, 108 Region
112, 114, 116, 118 Element
120 Common Document
122, 124, 126, 128 Region
200, 201, 202, 203, 204, 205, 206, 207 Differences Document
216 Element
220 Common Document
300, 320 Derived Document
326, 328 Region

The invention claimed is:

1. A document creation device for creating a document, comprising:
a document storage unit for storing a common document having a plurality of regions, to which new regions can be added, and which serves as a template for generating a derived document, each of the plurality of regions being a region where an element is embedded or an empty region where no element is embedded, and a different document in which there are cases in which there are no regions which individually correspond to each region of the common document and cases in which there are regions which individually correspond to each region of the common document, and when there are corresponding regions, the regions are regions in which elements different from the elements embedded in the common document are embedded or empty regions,
a management table storage unit which stores combination of regions of the different document in which the elements are embedded and regions of the common document corresponding to these regions, and
a document generating unit which generates a derived document from the common document by deleting elements of the common document, replacing the elements of the common document with the elements of the corresponding regions of the different document, or ignoring elements of the different document based on the combination of a presence or absence of regions stored in the management table storage unit and a presence or absence of an element in a region.

2. The document creation device according to claim 1, wherein the common document and the different document are associated with each other by a management table or document identification number, and a plurality of different documents are associated with one common document, and a plurality of derived documents, which are similar but which have a changed physical size due to replacement with an element in a region of the different document, a reduced number of elements due to an element having been removed from the common document due to an empty region in the different document, or a different number of elements and different physical size due to a number of elements and physical size added by an element in a region of the different document being added to an empty region of the common document, are generated from one common document.

3. The document creation device according to claim 2, further comprising a display processing unit which acquires data stored in the document storage unit and the management table storage unit, and based on the data, displays a list of relationships of elements embedded in each region of the plurality of different documents created for the one common document.

4. The document creation device according to claim 3, wherein the display processing unit displays a list of elements to be embedded in corresponding regions of the plurality of different documents created for the one common document.

5. The document creation device according to claim 1, further comprising a renumbering processing unit which renumbers duplicate, missing, or reversed numbers occurring in the derived documents generated by logical operations between the common document and the different document so that they become consecutive numbers.

6. The document creation device according to claim 1, wherein: the document generating unit, when the different document contains a region with an element associated with a region of the common document, replaces the element of the region of the common document with the element of the corresponding region of the different document regardless of whether the region of the common document has an element or is an empty region with no elements based on a combination stored in the management table storage unit, when a region of the common document is not associated with any of the regions of the different document, and the region of the common document contains an element, sets the element as the element of the derived document, and when the region of the common document is an empty region with no elements, deletes the region, when there is a region in the common document that corresponds to an empty region of the different document, deletes the region and the element in the common document, and when the different document contains a region that is not associated a region of the common document, deletes the region and element of the different document, and generates a derived document, or when there are documents derived from the different document that are already associated with the common document, adds a region with a new element to the common document or deletes the region from the common document to add a new element to the existing derived documents all at once or delete existing elements from the existing derived documents all at once, or adds an empty region to the common document and adds a corresponding region with an element to the new different document to generate a new derived document without affecting any existing derived document.

\* \* \* \* \*